Figure 8:
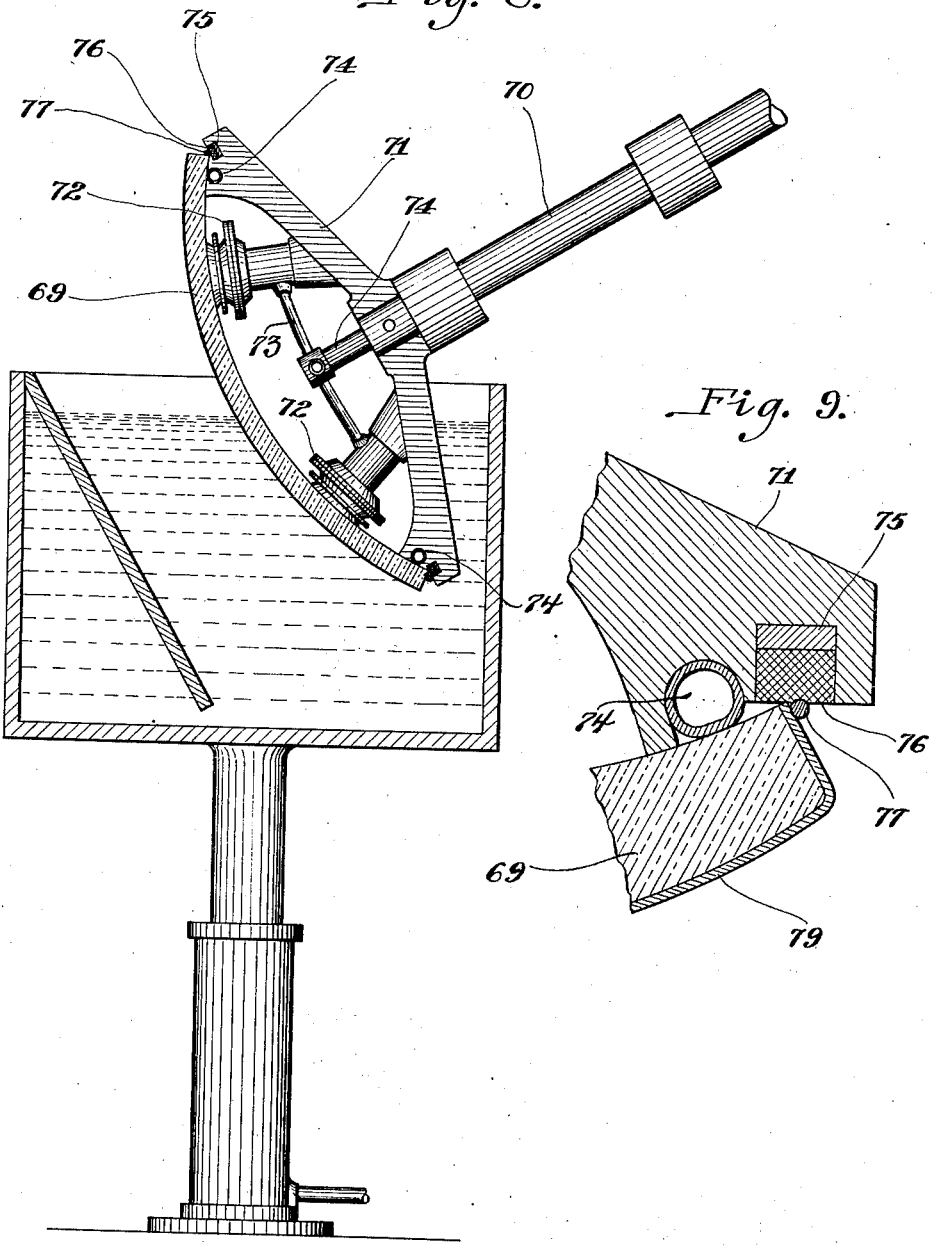

Oct. 19, 1926.
H. K. HITCHCOCK
1,603,951
PROCESS FOR MAKING MIRRORS OR REFLECTORS
Filed Nov. 17, 1923
5 Sheets-Sheet 1
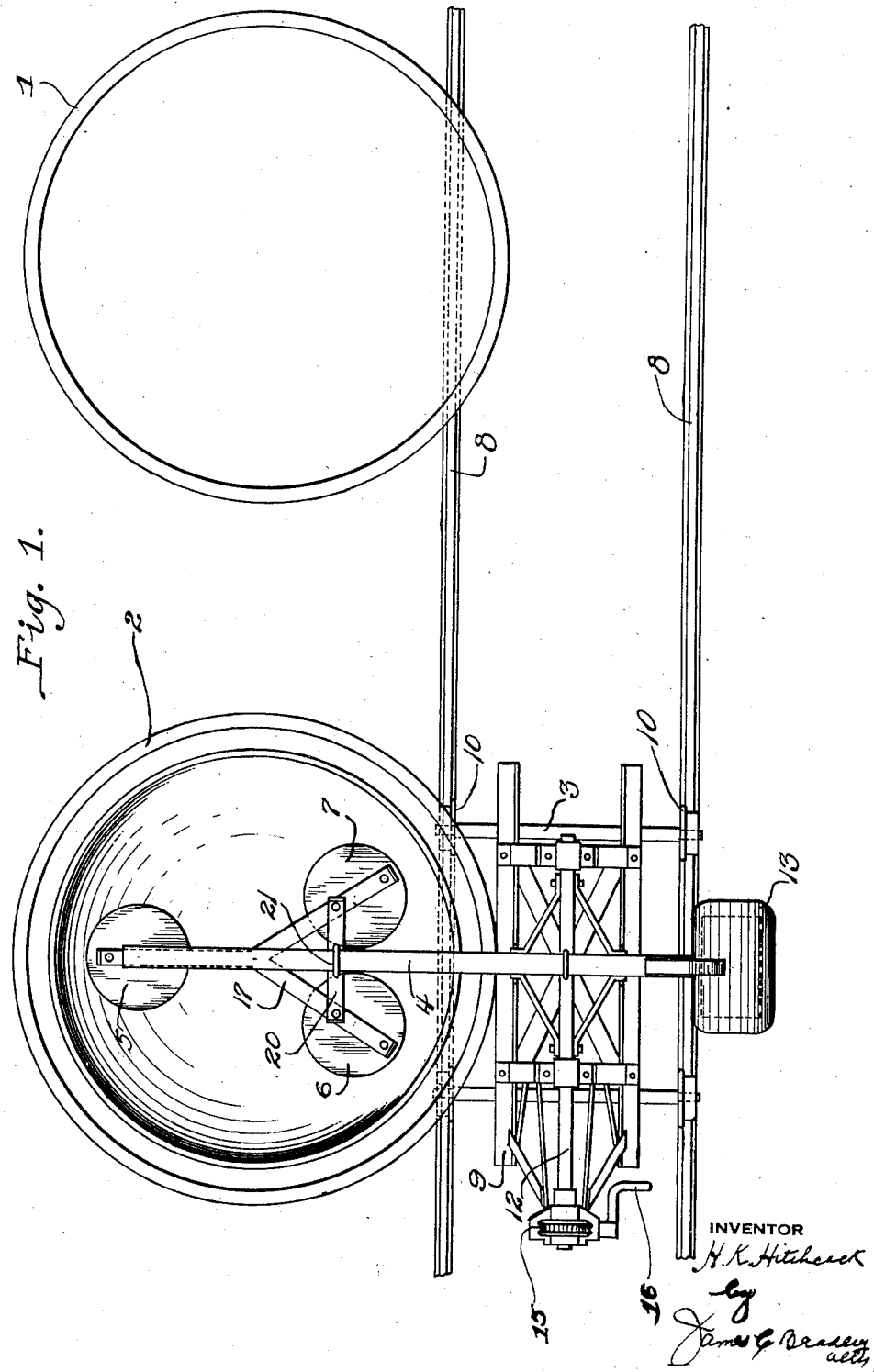

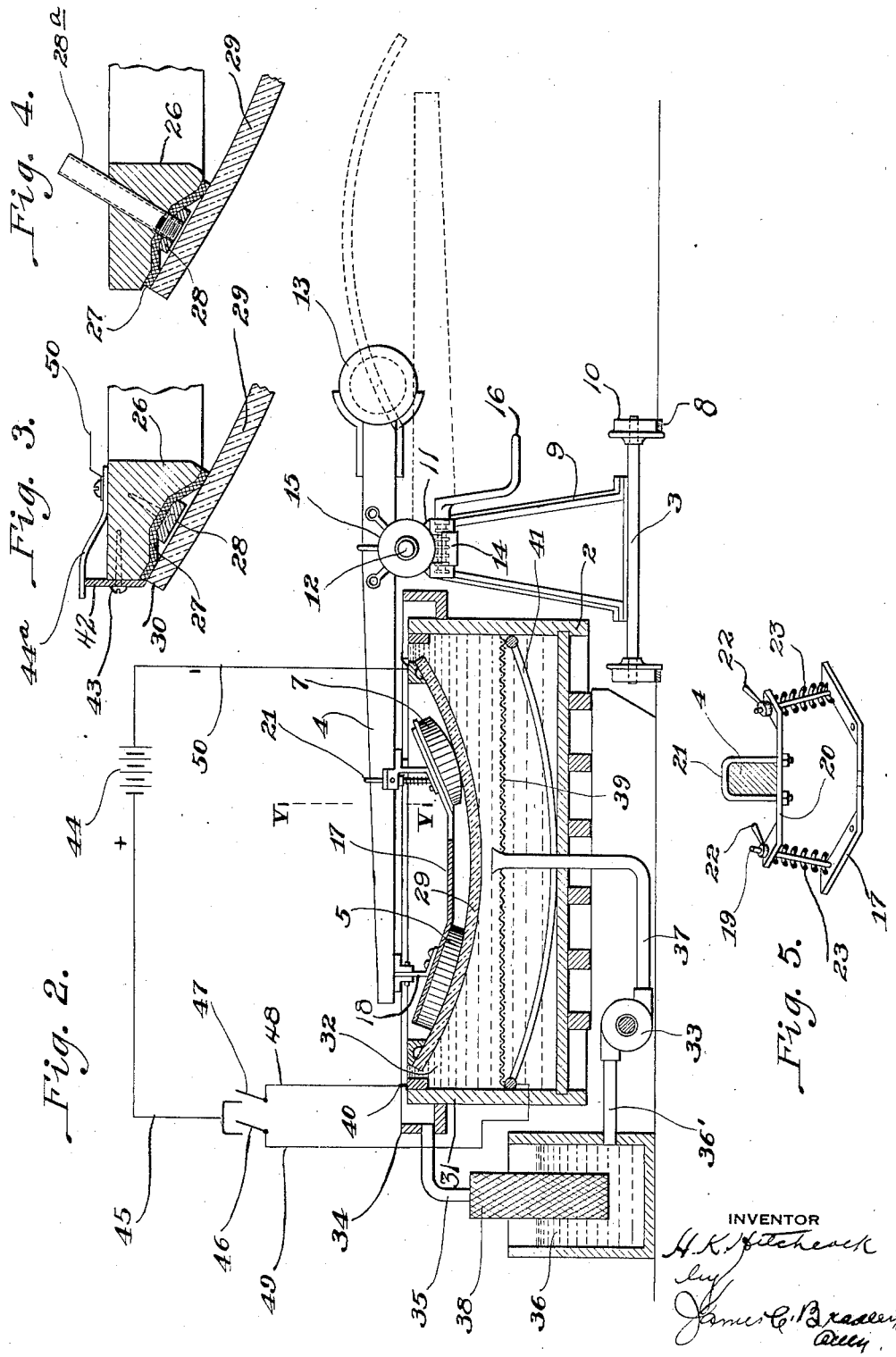

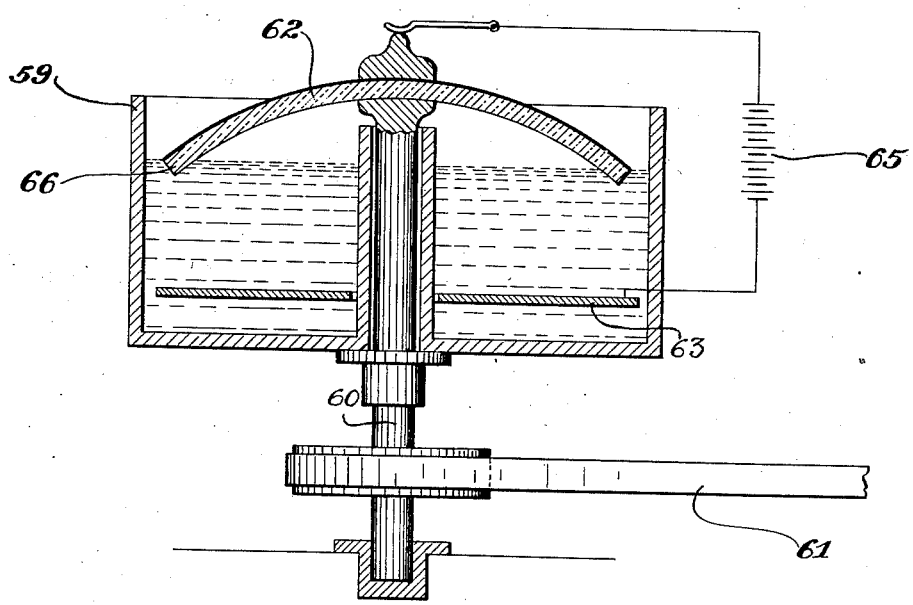
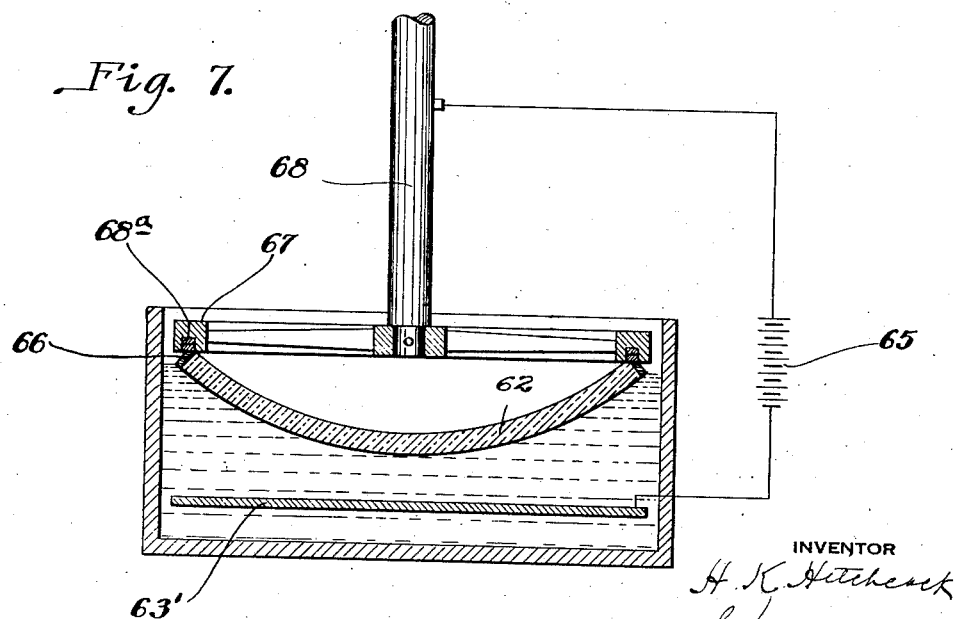

Oct. 19, 1926.  1,603,951
H. K. HITCHCOCK
PROCESS FOR MAKING MIRRORS OR REFLECTORS
Filed Nov. 17, 1923   5 Sheets-Sheet 4

INVENTOR
H. K. Hitchcock
by
James C. Bradley
atty.

Oct. 19, 1926.
H. K. HITCHCOCK
PROCESS FOR MAKING MIRRORS OR REFLECTORS
Filed Nov. 17, 1923
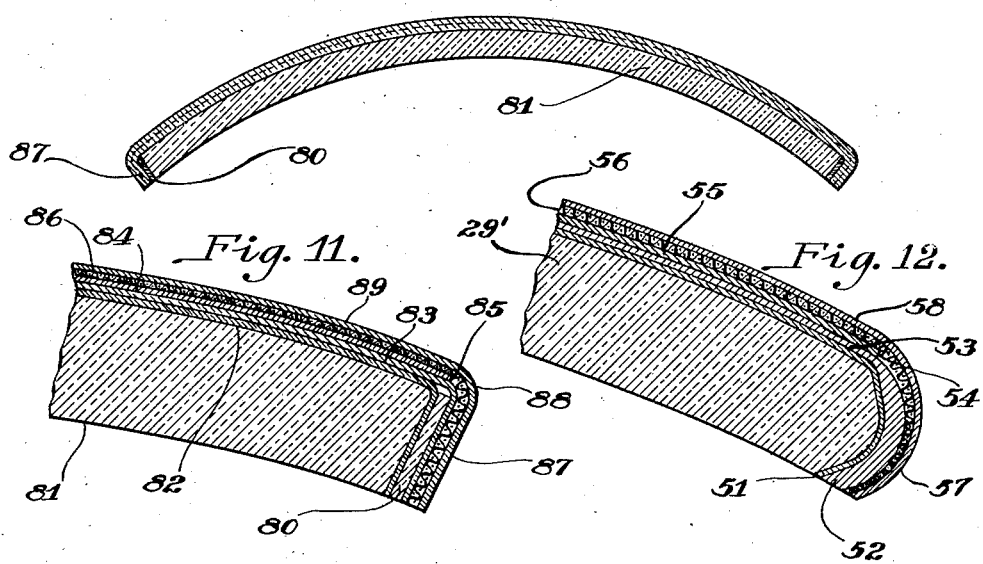
Fig. 10.
Fig. 11.
Fig. 12.
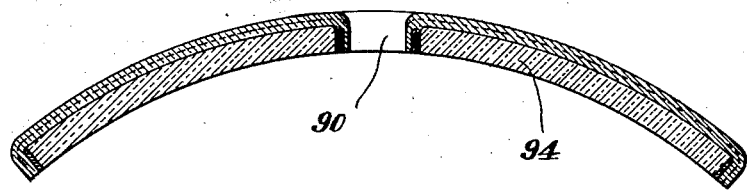
Fig. 13.
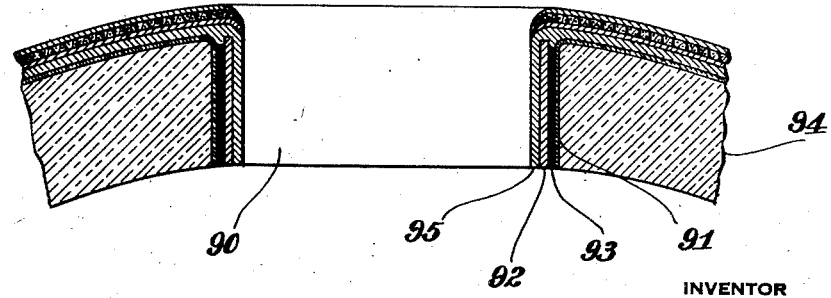
Fig. 14.
INVENTOR
H. K. Hitchcock
by
James C. Bradley
Atty Patented Oct. 19, 1926.

1,603,951

UNITED STATES PATENT OFFICE.

HALBERT K. HITCHCOCK, OF PITTSBURGH, PENNSYLVANIA, ASSIGNOR TO PITTS-
BURGH PLATE GLASS COMPANY, A CORPORATION OF PENNSYLVANIA.

PROCESS FOR MAKING MIRRORS OR REFLECTORS.

Original application filed March 8, 1919, Serial No. 281,558. Divided and this application filed November 17, 1923. Serial No. 675,417.

The invention relates to the process for making mirrors or reflectors. The invention is illustrated as applied to convex concave reflectors or lenses such as are used in search light or light house work and has its greatest utility in such connection, but the invention is not limited to such reflectors and is applicable to reflectors or mirrors of all types. Present application constitutes a division of application Serial No. 281,558 filed March 8th, 1919, such application being directed to the mirror or reflector itself. The invention has to do primarily with the plating for protecting the silvering and its method of application, and its principal objects are (1) the provision of an improved method for applying the plating, and (2) the provision of improved means for supporting and handling the glass plate during the coating operations.

The mirrors or reflectors for use in lighthouse and search light use often approximate five feet in diameter and it has been common to protect the silvering by plating a coating of metal, such as copper, over the silvering. This plating protects the silvering and prolongs its life, but heretofore has necessarily been made very thin and even when relatively thin has a tendency to become loosened and peel off with the silvering. This is due to the fact that a high tension is created in an electroplated coating, in some cases approaching the tensile strength of the metal, and this pull of the plating tends to loosen the silvering. The pull of the plating upon the silvering is directly proportional to the thickness of the plating and since the silvering is maintained on the glass only by adhesion, the plating has heretofore been made so thin as to only imperfectly perform its protecting function.

Figure 9:
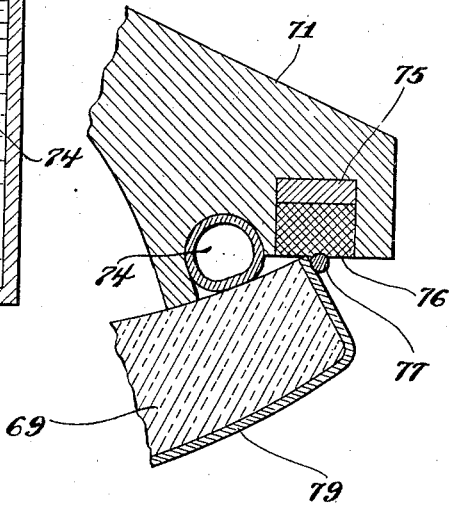

The purpose of the present invention is to provide a plating construction and means for applying it, whereby the plating may be made of any desired thickness and attached positively and securely so that it cannot become loosened. Briefly stated, this result is secured by providing a reinforcing and attaching band of metal upon the edge of the reflector or mirror to which the plating on the back of the silvering is secured. By the term edge, as used here, and in the claims, is meant the surface extending transversely of the back of the reflector such as the surface 30 of Fig. 3. With this construction, any strain imposed by the shrinkage of the plating is taken by the reinforcing band, so that there is no tendency to loosen the silvering. By this means a coating may be applied of such thickness as to form a perfect protection against injury to the silvering. The band upon the edge of the mirror is preferably secured by electroplating a relatively thick coating of metal over such edge before applying the plating to the back, but such band may, if desired, be provided by shrinking or otherwise securing by mechanical process, a ring of metal around the edge. In carrying out the process a glass sheet which is to be coated is preferably supported from its upper surface by a vacuum frame, which in turn is supported for movement from a position over the silvering bath, or series of baths, to a position over an electroplating bath. The sheet of glass supported in this manner is carried from one bath to the other and successively lowered in such baths, a silvering coating being first deposited, and subsequently an electrolytic coating or plating. In case the supporting or reinforcing band is to be electrically deposited, such coating is deposited in the electroplating bath before depositing the plating upon the back of the plate. After a relatively thick band of metal has been deposited upon the edge of the plate, the current is so directed through the bath that a plate is deposited both upon the back and upon the edge, thus securing the plating upon the back to that upon the edge. Certain embodiments of the invention and certain forms of apparatus for carrying out the process are illustrated in the accompanying drawings, wherein:

Figure 1 is a plan view showing the general arrangement of the apparatus. Fig. 2 is a partial vertical section through a part of the apparatus of Fig. 1 and a partial diagrammatic showing of the electric connections employed. Figs. 3 and 4 are enlarged detailed sections taken through the edge of the reflector of Fig. 2 and showing the means for preventing access of the liquid of the bath to the concave interior of the reflector. Fig. 5 is an enlarged section on the line V—V of Fig. 2. Fig. 6 is a vertical section through modified form of apparatus and illustrates the step of coating the band upon the edge of the reflector. Fig. 7 is a vertical section showing the step of coating the back of the reflector following the step of coating the edge as illustrated in Fig. 6. Fig. 8 is a vertical section through still another form of apparatus which may be employed in carrying out the process. Fig. 9 is an enlarged vertical section through the edge of the reflector and supporting device as illustrated in Fig. 8. Figs. 10 and 11 are sections through a completed reflector, Fig. 11 being an enlargement at the edge of the construction of Fig. 10. Fig. 12 is an enlarged section through a modified reflector construction, and Figs. 13 and 14 are sections through still another type of reflector, having an opening through its central portion, Fig. 14 being an enlarged section at the center of the reflector of Fig. 13.

Referring first to the construction shown in Figs. 1 and 2, 1 is a silvering bath; 2 is an electroplating bath; 3 is a truck carrying transversely thereof a vacuum frame 4 provided with the three vacuum lifting cups 5, 6 and 7, and 8 is the track upon which the truck is mounted to move, so that the reflector may be carried from one bath to the other, first receiving the silvering coating in bath 1, which may be the last one of a series of baths for securing the silvering treatment, and then receiving the electrical coating in the bath 2.

The truck 3 comprises a framework 9 mounted upon the wheels 10 and provided at its upper portion with a bearing member 11 upon which the frame 3 is pivotally mounted on shaft 12. The frame 3 is preferably counterweighted, as indicated at 13, and is swung about at the shaft 12 by means of a worm 14 and gear 15 co-operating therewith, the worm 14 being turned by means of the handle 16.

The vacuum cups 5, 6 and 7 are carried by a Y-shaped frame 17, secured at one end to the beam 3 by means of the angle clip 18, and secured at its other end to such beam by means of the adjusting device illustrated in Fig. 5. This device comprises a pair of threaded rods 19, secured at their lower ends to the frame 17 and passing at their upper ends through the transverse plate 20, secured to the beam 3 by means of the clip 21. Wing nuts 22 are provided on the upper ends of the rods 19 and springs 23 provide a pressure tending to move the frame 17 downward. The foregoing construction provides a means whereby the reflector carried by the beam may be leveled up so that when placed in the bath of liquid, the level of the liquid will be at the same point throughout the circumference of the reflector. The spring in the clip 18 permits the frame 17, carrying the vacuum cups, to be moved up and down a limited amount around this clip as a pivot, and the adjustable rods 19, with their wing nuts 22, permit the other end of the frame 17 to be adjusted up or down the slight amount necessary to bring the upper edge of the reflector into a horizontal plane.

In order to prevent the liquid from the bath overflowing into the interior of the reflector when the reflector is pushed down into the bath, so that the liquid rises above the edge thereof, the annular sealing member 26 is employed. This member may be of either wood or metal, and is provided on its lower edge with what may be termed an annular cup, such cup consisting of an annular recess in the member 26, in which is mounted the rubber strip 27. The rubber strip 27 is secured by means of the metal strip 28 (Fig. 3), held by screws, and air may be exhausted from the lower side of the strip through the pipe 28$^a$ (Fig. 4). When air is exhausted in this manner from the annular vacuum cup, the member 26 is pulled down tightly against the inner surface of the plate 29 so that the liquid in the bath may rise above the edge 30 of the plate without leaking into the interior of the reflector. Having the level of the liquid extend a slight distance above the edge 30 insures that this entire edge shall be coated, even though the edge 30 should not be entirely true throughout its entire circumference, and though its vertical position should vary slightly. This sealing member 26 is useful not only in the plating operation in the bath 2, but also in the silvering operation which occurs in the bath 1 and other preliminary baths preceding the bath 1 and not shown.

The plating bath is preferably constructed as illustrated in Fig. 2, and comprises a tank 31 containing the liquid 32 and having a circulating pump 33. The purpose of the pump is to secure a flow of liquid over the surface of the reflector, thus removing bubbles and giving a more uniform deposit. The overflow from the tank is received in a trough 34, having an outlet pipe 35 leading to the tank 36, the pipe 36' constituting the inlet to the pump and 37 the outlet therefrom. The pipe 35 discharges through the filter 38 in order to remove impurities from the liquid, and the bath itself is provided with a filtering fabric 39, through which the pipe 37 extends. The bath is provided with two anodes, one of which, 40, lies at the upper edge of the bath and comprises an annular band, while the other of which, 41, is in the form of a dished perforated member or grid of copper or brass lying below the fabric 39 and following the contour of the reflector. The cathode consists of the silver plating on the back of the mirror and is connected to the battery or source of current by a strip of metal 42 (Fig. 3), which extends around the edge of the member 26 and is fastened thereto by means of screws 43. This strip 42 is preferably of copper or brass and engages the silvering on the edge of the glass sheet. Preferably this strip 42 is silvered in the silvering bath at the same time that the silvering is applied to the back and edge of the reflector, so that a good contact between the strip and the silvering is insured. Electrical contact is made by means of a plurality of copper or brass springs 44 secured to the member 26 and engaging the top of the band 42, which serve also to keep the ring in contact with the edge of the mirror.

The electrical apparatus and connections comprise the source of current 44ª, the wire 45 leading to the two switches 46 and 47, the wires 48 and 49 leading to the anodes 40 and 41 and the return wire 50 leading from the band 42 to the source of current 44.

The operation of coating the convex side of a reflector is as follows. The plate is secured upon its concave side to the vacuum cups 5, 6 and 7, and the convex face of the reflector is dipped into the bath 1, this dipping being to such depth that the edge 30 (Fig. 3) of the reflector is silvered as well as the convex surface. The truck is then moved to the position of Fig. 1 and the reflector lowered into the bath occupying the position illustrated in Fig. 2. At this time the level of the liquid is slightly above the extreme upper edge of the plate 29. The switch 47 is now closed so that a flow of current passes through the liquid from the anode 40 to the silvered edge 30 and a deposit of metal from the bath, such as copper, is secured upon such edge 30. This deposit is continued until a relatively thick strong band of copper is secured upon the edge of the reflector. At this time there is a certain amount of deposit upon the back of the reflector adjacent the edge 30, but this deposit is relatively slight and there is practically no deposit upon the main portion of the back of the reflector. After this band of metal has been deposited upon the edge of the reflector, the switch 46 is closed, so that the current passes to the anode 41 and thence through the liquid to the silvered back of the reflector. This flow of current is continued until the necessary thickness of deposit is secured. If desired, successive coats of plating may be applied both to the edge and to the back of the reflector.

Fig. 12 of the drawing illustrates the deposit of plating upon the edge of a reflector as a result of the procedure above described, the edge of the reflector in this case being rounded, although this is not necessarily the case, as such edge may be either straight or concave. Fig. 12 also illustrates additional protecting means which are applied to the reflector after the plating operation. The coatings in this figure are, of course, exaggerated, in order to make them clearer. As here shown, 51 is the silvering coating, 52 is the plating of copper upon the edge of the reflector, and 53 is the lighter coating of copper upon the back of the reflector. Over the back of the reflector and terminating at the point 54 is a coating of varnish 55, and over this coating of varnish is a woven metal fabric 56, which extends over the back of the reflector and over the edge thereof as illustrated. After this fabric is applied, the reflector is returned to the plating bath and an edge plating 57 is applied, such edge plating extending around to the point 54 and serving to securely anchor the metallic fabric in position. A further coating of varnish 58 is then applied, extending over the back to the point 54.

Figs. 6 and 7 illustrate a modified method of procedure. In the construction here illustrated, 59 is the tank, 60 is a shaft rotated from the belt 61, 62 is the reflector to be coated, carried at the upper end of the shaft, 63 is a metal plate carried in the plating bath, and 64 is a contact plate engaging a contact weight above the upper end of the shaft 60. Current is supplied from a battery 65, which has connection with the plates 63 and 64. After the back and edge of the reflector have been silvered, the parts are positioned as illustrated in Fig. 6, and a relatively heavy band of metal is placed upon the edge of the reflector, as indicated at 56, the shaft 60 being revolved in order to secure the removal of any bubbles from the edge of the reflector and to give a uniform deposit. After the plating of the edge, the reflector is inverted, as indicated in Fig. 7, and an annular member 67, provided with a groove 68ª, is applied in the manner illustrated, the member 67 being carried by shaft 68 so that the reflector may be rotated. The groove 68ª is provided with an electric conducting wax so that when the reflector is pushed down to the position illustrated, the wax in the groove 68ª contacts with the plated edge 66 with sufficient force to give a rotation of the reflector when the annular member 67 is rotated. An electrical connection is made to the shaft 68 so that when current is applied to the plate 63' and taken from the shaft 68 as indicated, 65 being the source of current, a flow of current through the bath is secured, thus plating the convex surface of the reflector. The depth to which the reflector is placed into the liquid is such that the plating applied in the operation of Fig. 7 overlaps the plating 66 at the edge of the reflector. The rotation of the shaft 68 serves to give more uniform plating and keep the surface of the reflector free from bubbles.

Figs. 8 and 9 illustrate still another method of carrying out the process of plating so that a heavier deposit is secured upon the edge of the reflector than upon the back. In this construction the silvered plate 69 is carried and rotated from the shaft 70, set at an angle to the bath in the tank 71. The shaft 70 is provided with a framework 71, having a plurality of suction cups 72, such suction cups being of any desired approved type, and being operated through the pipes 73 and 74, leading through the shaft 70.

In order to prevent the entrance of liquid to the concave side of the reflector, the pneumatic packing ring 74, shown in Fig. 9, is employed. This ring fits in a recess in the frame 71 and when air pressure is supplied to the ring it expands and makes a tight joint. The edge of the member 71 is provided with a recess carrying the metal strip 75, over which is a metallic paste 76. Around the edge of the reflector is a reinforcing band or rod 77, and the metallic wax 76 makes contact with this band and with the upper edge of the reflector, as illustrated in Fig. 9. When the reflector is rotated in the position illustrated in Fig. 8, and current is applied to the anode 78 and to the strip 75, lying behind the metallic wax, a flow of current through the bath is secured and a deposit of metal upon the back of the silvering 79 is secured. This deposit of metal extends up around the edge of the reflector and anchors the reinforcing member 77 in position. This gives a reinforcing at the edge of the reflector consisting partially of the deposited metal and partially of the annular member 77. If a heavier deposit of metal upon the edge of the reflector is desired, this may be secured by raising the shaft 70, with respect to the bath, until the edge of the reflector extends into the liquid only a slight distance. If now the coating action is allowed to continue for a while longer, an additional deposit is secured upon the edge of the reflector and extends only a slight distance over the back of the reflector.

Figs. 10 and 11 illustrate a reflector construction in which the band 80 at the edge of the plate 81 is formed separately and placed upon the reflector instead of being plated upon the reflector, as heretofore described. As shown in Fig. 11, 82 is the silvering, and after this coating and the band 80 have been applied, the plating coating 83 of copper is applied, as heretofore described. This coating extends over the back of the reflector and also over the metal band 80, so that the plating at the back is securely attached to the edge band. After the plating has been applied, the varnish coat 84 is applied, extending to the point 85. Over this coating the metal fabric 86 is placed, such fabric extending around over the edge of the reflector and being secured in place by the plating 87, which extends up to the point 88. A final coating of varnish 89 is then applied over the metal fabric on the back of the reflector.

Figs. 13 and 14 illustrate the invention as applied to a reflector having the opening 90 through the center. The construction at the outer edge of the reflector is the same as heretofore described in connection with Figs. 10 and 11, but the reinforcing around the opening 90 is somewhat different, as illustrated in Fig. 14. As here shown, 91 is the silvering coating and between this coating and the metal ring 92 a layer 93 of wax is introduced. This cushions the ring and takes care of the difference in expansion and contraction between the ring 92 and the glass plate 94. The plating 95 of copper or other metal is applied over the silvering at the back of the reflector and over the ring 92, as in the construction heretofore described. The protecting coatings of metal fabric and varnish are applied as in the other types of construction.

What I claim is:

1. The process of electroplating a reflector which consists in silvering the back and edge of a glass plate, depositing a band of metal upon said edge by electrolysis, and then depositing a metal coating by electrolysis on said back and extending over said band.

2. The process of electroplating a concave convex glass plate which consists in silvering the convex surface of the plate and its edge, supporting the plate in an electroplating bath with its convex surface down and with the liquid extending up over said edge passing a current between the edge, and an electrode placed laterally adjacent thereto to cause a deposit on said edge, and then passing a current between the silvering on the convex surface of the plate and an electrode below such surface to cause a deposit on such surface.

3. The process of electroplating a reflector which consists in silvering the back and edge of a glass plate, and depositing a protecting coating of metal upon the silvered back and edge of the plate by electrolysis so that the coating on the edge is relatively heavy and constitutes an anchoring and securing means for the plating on the back of the plate.

In testimony whereof, I have hereunto subscribed my name this 15th day of November, 1923.

HALBERT K. HITCHCOCK.